(12) United States Patent
Dorn

(10) Patent No.: US 12,093,444 B2
(45) Date of Patent: Sep. 17, 2024

(54) METHOD FOR OPERATING DATA GLASSES IN A MOTOR VEHICLE AND SYSTEM OF A MOTOR VEHICLE AND DATA GLASSES

(71) Applicant: Audi AG

(72) Inventor: Sebastian Dorn, Rain (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/800,308

(22) PCT Filed: Feb. 12, 2021

(86) PCT No.: PCT/EP2021/053427
§ 371 (c)(1),
(2) Date: Aug. 17, 2022

(87) PCT Pub. No.: WO2021/170421
PCT Pub. Date: Sep. 2, 2021

(65) Prior Publication Data
US 2023/0065018 A1 Mar. 2, 2023

(30) Foreign Application Priority Data
Feb. 27, 2020 (DE) .................. 10 2020 105 196.4

(51) Int. Cl.
*G06F 3/01* (2006.01)
*G06T 7/246* (2017.01)
(Continued)

(52) U.S. Cl.
CPC .............. *G06F 3/012* (2013.01); *G06T 7/251* (2017.01); *G06T 7/75* (2017.01); *G06T 19/006* (2013.01);
(Continued)

(58) Field of Classification Search
CPC ........ G06F 3/012; G06F 3/011; G06F 3/0304; G06T 7/251; G06T 7/75; G06T 19/006;
(Continued)

(56) References Cited

U.S. PATENT DOCUMENTS

2012/0120070 A1\* 5/2012 Baillot .................. G08B 25/14
345/419
2015/0029223 A1\* 1/2015 Kaino ................... G09G 3/002
345/633
(Continued)

FOREIGN PATENT DOCUMENTS

DE 10 2013 210 746 A1 12/2014
DE 10 2014 213 285 A1 1/2016
(Continued)

OTHER PUBLICATIONS

Office Action dated Jan. 7, 2021 for German Application No. 10 2020 105 196.4.
(Continued)

*Primary Examiner* — Hong Zhou
(74) *Attorney, Agent, or Firm* — STAAS & HALSEY LLP

(57) ABSTRACT

A processor circuit, which is provided in data glasses or coupled to the data glasses via a communication connection, receives image data from at least one camera of the data glasses, representing an environment of the data glasses. A digital model of at least one predetermined orientation object is stored in the processor circuit and a predetermined matching routine checks whether the model correlates with an image region of the environment represented in the image data. If a correlation is identified, a relative position associated with the image region via a coordinates map is
(Continued)

determined and image content of the data glasses is controlled according to the determined relative position of the at least one orientation object.

19 Claims, 2 Drawing Sheets

(51) Int. Cl.
  *G06T 7/73* (2017.01)
  *G06T 19/00* (2011.01)
(52) U.S. Cl.
  CPC ............... *G06T 2207/30244* (2013.01); *G06T 2207/30268* (2013.01)
(58) Field of Classification Search
  CPC ........... G06T 2207/30244; G06T 2207/30268; B60K 2370/1529; B60K 2370/177; B60K 2370/21; B60K 35/00
  See application file for complete search history.

(56) References Cited

U.S. PATENT DOCUMENTS

| | | | |
|---|---|---|---|
| 2015/0100179 A1* | 4/2015 | Alaniz | B60W 50/14 701/1 |
| 2015/0199847 A1 | 7/2015 | Johnson et al. | |
| 2015/0294505 A1* | 10/2015 | Atsmon | G06T 19/006 345/633 |
| 2015/0325052 A1* | 11/2015 | Kuehne | H04N 5/272 345/633 |
| 2016/0207539 A1 | 7/2016 | Jung | |
| 2017/0050743 A1 | 2/2017 | Cole et al. | |
| 2017/0115730 A1* | 4/2017 | Knebel | G02B 27/0172 |
| 2018/0040162 A1 | 2/2018 | Donnelly et al. | |
| 2018/0081426 A1 | 3/2018 | Rothkopf | |
| 2018/0186466 A1 | 7/2018 | Cole et al. | |
| 2019/0179510 A1 | 6/2019 | Kritzler et al. | |
| 2019/0384383 A1* | 12/2019 | Lee | G06F 3/011 |
| 2020/0167556 A1* | 5/2020 | Kaur | G06F 3/0304 |
| 2020/0218065 A1* | 7/2020 | Haar | G06F 3/011 |

FOREIGN PATENT DOCUMENTS

| | | |
|---|---|---|
| DE | 10 2016 224 122 A1 | 6/2018 |
| DE | 10 2017 217 592 A1 | 4/2019 |
| DE | 10 2020 105 196.4 | 2/2020 |
| WO | 2017/025483 A1 | 2/2017 |
| WO | 2018/057980 A1 | 3/2018 |
| WO | 2018/058361 A1 | 4/2018 |
| WO | PCT/EP2021/053427 | 2/2021 |

OTHER PUBLICATIONS

Translation of International Preliminary Report on Patentability and Written Opinion of the International Searching Authority dated Apr. 29, 2021 for International Application No. PCT/EP2021/053427.

* cited by examiner

METHOD FOR OPERATING DATA GLASSES IN A MOTOR VEHICLE AND SYSTEM OF A MOTOR VEHICLE AND DATA GLASSES

CROSS REFERENCE TO RELATED APPLICATIONS

This application is a U.S. national stage of International Application No. PCT/EP2021/053427, filed on Feb. 12, 2021. The International Application claims the priority benefit of German Application No. 10 2020 105 196.4 filed on Feb. 27, 2020. Both the International Application and the German Application are incorporated by reference herein in their entirety.

BACKGROUND

The Described below is a method for operating data glasses in a motor vehicle. Such data glasses can be embodied as so-called VR glasses (VR—Virtual Reality) or as AR glasses (AR—Augmented Reality). Also described are a data glasses device with such data glasses and a processor circuit, as well as a system of such a data glasses device and a motor vehicle.

A pair of data glasses (also referred to as HMD—Head Mounted Display) can be worn on the head by a user, such that a display device of the data glasses, for example a pixel-based screen or a projection unit, is arranged in front of the user's eyes in order to display an image content in the user's field of view. In order nevertheless to give the user the impression that he/she is looking into a space, that is to say that the displayed image contents, for example virtual objects, are situated in this virtual space and are not fixedly connected to the user's head, the display content is shifted during movements of the head in order that the displayed virtual objects maintain a virtual relative position with respect to the user, even when the latter turns his/her head. If the user turns his/her head by a specific rotation angle toward the left, for example, then in the display content an object that is stationary in the virtual space is shifted by the same rotation angle toward the right in the display content, such that from the user's viewpoint it appears to be stationary and does not follow the head movement.

For this purpose, however, it is necessary for the data glasses to sense a head movement by the user. US 2018/0081426 A1 discloses that acceleration sensor can be installed in the data glasses for this purpose, the acceleration sensors detecting the head movement on the basis of acceleration forces. In order to be able to differentiate between such acceleration forces that are caused by the movement of the head itself and such acceleration forces that can be measured in the data glasses even when the head is stationary owing to the movement of the motor vehicle, a measurement of the acceleration forces of the motor vehicle that is independent of the head is carried out by an additional mobile device, for example a tablet PC. However, this requires an additional inertial sensor outside the data glasses.

Controlling a display content rendered by data glasses depending on a route of travel of a motor vehicle is known from WO 2018/057980 A1 for example.

With the use of inertial sensors or acceleration sensors for sensing the head movement, complex compensation measures are necessary in an accelerated three-dimensional space, such as a vehicle interior of a motor vehicle, for example.

SUMMARY

Described below is a method of operating data glasses in a motor vehicle, in particular during travel of the motor vehicle, when acceleration forces may occur on account of a vehicle acceleration and/or cornering.

The method for operating data glasses in a motor vehicle can include sensing a head movement of the head of a user wearing the data glasses. In a moving and/or accelerated reference system, such as a vehicle interior, for example, it can happen that not just the user's head but rather the entire user is moved and/or accelerated even though he/she is keeping the head itself stationary. As a result, a corrupted or unwanted change in the display content may occur because, in contrast to what is actually intended, it is not caused by solely the movement of the head (with respect to or in relation to the user's torso).

In the method a processor circuit receives image data from a camera of the data glasses. The respective capture region of the at least one camera is directed into the environment of the data glasses, that is to say away from the data glasses, such that at least one object in the environment of the data glasses is recognized or filmed or captured. The image data accordingly represent the environment of the data glasses and show the at least one object. The receiving processor circuit that receives the image data can be provided in the data glasses themselves or it can be coupled to the data glasses via a communication connection, that is to say can then be provided outside the data glasses. A suitable communication connection can be realized for example on the basis of a WLAN radio module (WLAN—Wireless Local Area Network). The communication connection can also be effected in a wired manner, for example via a USB cable connection (USB—Universal Serial Bus).

The method enables the movement of the data glasses in the motor vehicle to be sensed not by an acceleration sensor alone or independently of an acceleration sensor. Moreover, provision is specifically made for a digital model of at least one predetermined orientation object to be stored in the processor circuit. Such an orientation object can be for example the inner wall of the vehicle interior and/or a backrest of a seat and/or a dashboard and/or a center console of the motor vehicle. A predetermined matching routine or comparison routine may be run by the processor circuit to check whether the model matches an image region of the environment such as is represented in the image data. The image data represent in each case an image or a video of the environment and the matching routine is used to check whether the at least one orientation object is also contained or imaged in the image or video. This part of the image here is the described image region in the image. If such a match between model and image region is identified, a relative position of the orientation object in relation to the glasses is determined by the processor circuit. This relative position arises from the image region for which the match with the model was identified.

For this purpose, the image region is assigned to the relative position by way of a coordinate mapping. In particular on the basis of the so-called extrinsic and/or intrinsic camera data and/or the installation position of the camera, it is possible to determine which spatial region or spatial direction corresponds in each case to an image region, for example a pixel or a pixel group. If an orientation object is identified in a specific image region of the camera image, then the coordinate mapping can be used to determine the coordinates in the environment to which the image region corresponds or the direction vector in relation to the data glasses to which the image region corresponds. Given knowledge then of the relative position and/or the direction vector of the at least one orientation object in relation to the data glasses, the processor circuit controls an image content of the data glasses, that is to say the image content viewed by the user, depending on the determined relative position and/or direction vector of the at least one orientation object. In particular, on the basis of the relative position and/or direction vector, it is possible to identify a movement of the head on which the data glasses are arranged, or by which the data glasses are worn, in relation to the vehicle interior. For this purpose, a component that is concomitantly moved in the motor vehicle is in each case utilized as a respective orientation object. If the head is kept stationary, such that the data glasses are thus also motionless in relation to the vehicle interior, then this can be identified on the basis of the relative position in relation to the at least one orientation object, such that even if the vehicle accelerates and/or carries out cornering, this not to a mistaken change in the image content in the way that would arise if the user carried out a corresponding head movement in the vehicle interior. The method is reliable for control of the image content in the manner described particularly if the at least one orientation object is part of the vehicle interior.

The method provides an advantage over the prior art in that even in the case of the acceleration forces acting in a motor vehicle, independently of an acceleration sensor, it is possible to distinguish whether or not the user is moving his/her head in the vehicle interior. The embodiments described below afford additional advantages.

In one embodiment, the model is a digital data model which is not dependent on the actual motor vehicle, but rather describes a prototype of the motor vehicle. In other words, the model involves prepared model data stored in the processor circuit. Such model data can be gleaned from a CAD model (CAD—Computer Added Design), for example. The use of model data of a prototype affords the advantage that in the motor vehicle there is no need for a configuration phase for generating the model of the specific or concrete motor vehicle. Moreover, the model is more accurate than a model such as might be created by a user of the data glasses in a configuration phase.

It may nevertheless be the case that a specific or concrete motor vehicle presents a different appearance in the vehicle interior in comparison with the prototype because a user for example has placed an article on the center console and/or has attached a decoration to a backrest of a seat or to a rear-view mirror, for example has hung a stuffed animal there. In order nevertheless to be able to identify a match with the model, one embodiment provides that before the checking, the image data are processed by a predetermined processing routine, which reduces a degree of detail in the representation of the environmental in the image data. Such a processing routine can be attained by a so-called Gaussian filter or a blurring filter, for example. Articles having a predetermined size in the image data can thereby be made so unrecognizable that they have more of a reduced influence on the matching routine. This can be set by way of the size of the Gaussian filter, for example. The processing routine can additionally or alternatively provide a color change and/or brightness change in the image data in order e.g. to at least partly compensate for an influence of current lighting. Consequently, mounting or arranging an article in the vehicle interior can no longer influence or disturb the matching routine.

In order to adapt or recognize a model in image data, one embodiment provides that the matching routine carries out the check on the basis of a SLAM algorithm (SLAM—Simultaneous Localization and Mapping). In addition or as an alternative thereto, it is possible to have recourse to a computer vision algorithm (CV algorithm). Further examples of a matching algorithm are: an artificial neural network, a correlation.

In one embodiment, the model describes the vehicle interior of the motor vehicle and in this case, in particular, a pane region of at least one window pane is marked in the model as a region that is irrelevant to the checking. In this case, checking is taken to mean checking whether the model matches an image region. The reason for marking the pane region is that an exterior region of the motor vehicle is visible through a window pane in the motor vehicle from the vehicle interior. In other words, the exterior region of the motor vehicle and thus the environment of the motor vehicle can be identified in such a pane region of the camera image. Marking the pane region as an irrelevant region affords the advantage that the calculation of the relative position in relation to the vehicle interior can be carried out robustly since no image information from the exterior region can disturb the check by the matching routine.

In one embodiment, a movement signal is determined or generated on the basis of the change in the determined relative position with respect to time, the movement signal describing a glasses movement of the data glasses in relation to the motor vehicle. The relative position in relation to the at least one orientation object is thus implemented repeatedly and the movement of the data glasses can be deduced from a change in the relative position. Not only a head position in relation to the at least one orientation object but also a head movement can be determined or identified this way.

This movement identification can be interpreted as temporal derivation of the individual relative positions identified in temporal succession. In addition, for this purpose provision can be made for a glasses acceleration signal to be sensed from an acceleration sensor of the data glasses, from which signal a movement can likewise be determined by temporal integration. In this case, however, it must be taken into consideration that the glasses acceleration signal can describe both the movement of the head in relation to the vehicle interior and the movement of the vehicle in relation to the external environment. In order to draw a distinction in this respect, in accordance with the embodiment, a vehicle acceleration signal is received from an acceleration sensor of the motor vehicle itself, that is to say an acceleration sensor that is operated independently of the data glasses. A difference signal is then calculated from the vehicle acceleration signal and the glasses acceleration signal and therefrom a plausibilization signal is determined, describing an estimated movement of the data glasses within the motor vehicle, such as can be determined from the different signal between the two acceleration signals. The plausibilization signal is compared and/or combined with the movement signal generated from the change in the determined relative position with respect to time in the manner described. A comparison makes it possible to identify whether a movement of the head in the vehicle interior actually occurred. A combination makes it possible to generate a more robust movement signal, in particular by virtue of the fact that the movement signal is then based firstly on a temporal derivation and secondly on a temporal integration.

Carrying out the method necessitates at least the described combination of data glasses and processor circuit. This combination is provided by a data glasses device. In this case, the processor circuit is configured to implement an embodiment of the method. The processor circuit, in the manner described, can be integrated in the data glasses or be coupled to the data glasses via the communication connection described. A processor circuit can be formed on the basis of at least one microprocessor, for example. The at least one microprocessor can be connected or coupled to a data memory in which can be stored program instructions which, when executed by the processor circuit, cause the latter to carry out the embodiment of the method.

The combination of the described data glasses device with a motor vehicle yields a system that can include an automobile, in particular a car or truck.

The motor vehicle described may be embodied as an automobile, in particular as a car or truck, or as a passenger bus.

BRIEF DESCRIPTION OF THE DRAWINGS

These and other aspects and advantages will become more apparent and more readily appreciated from the following description of the exemplary embodiments described below, taken in conjunction with the accompanying drawings of which.

DETAILED DESCRIPTION

Figure 1:
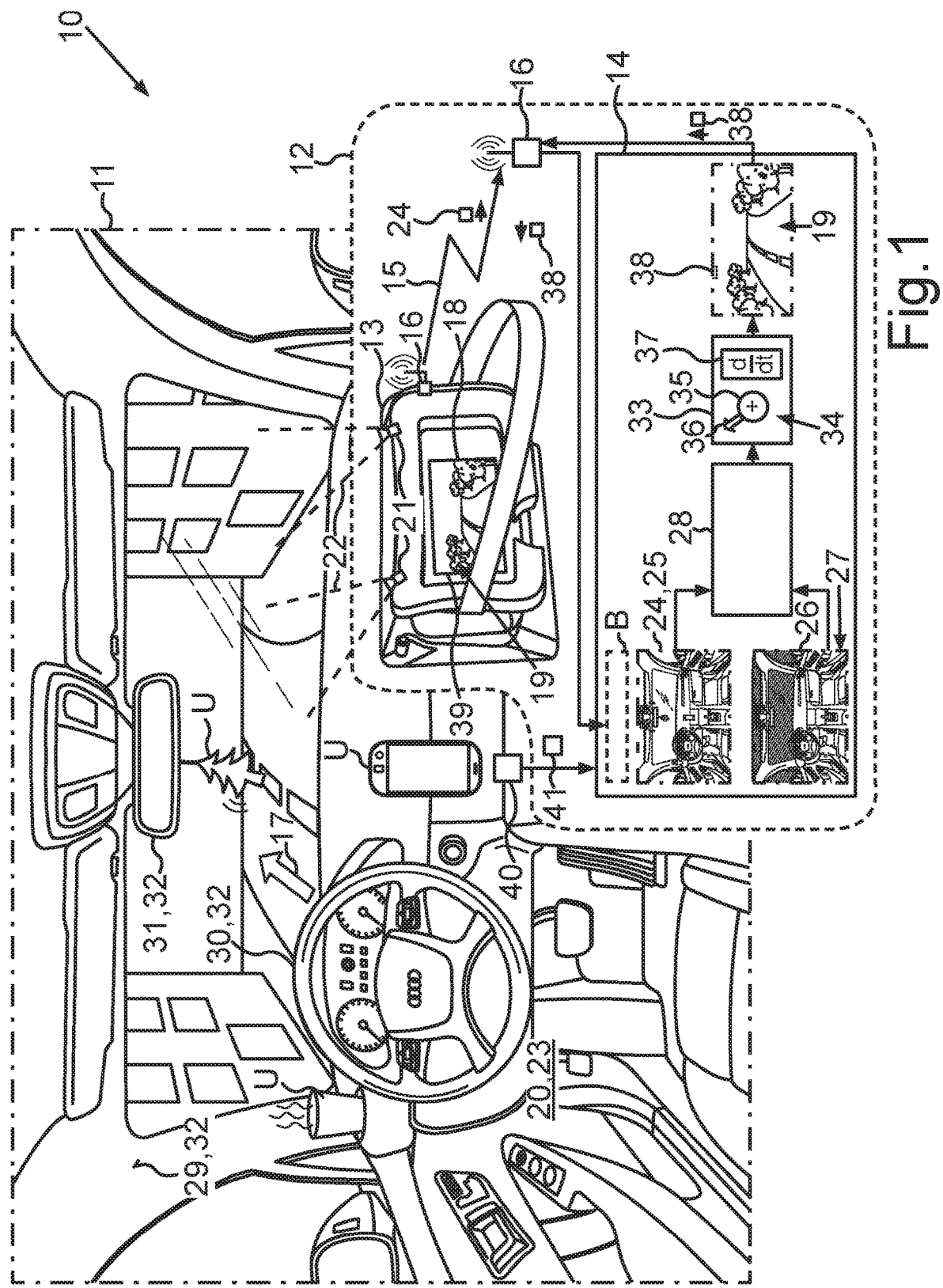
FIG. 1 is a schematic illustration of one embodiment of the system.

The exemplary embodiments explained below have described components that constitute individual features which are to be considered independently of one another and which each also develop the invention independently of one another. Therefore, the disclosure is also intended to encompass combinations of the features of the embodiments other than those presented. Furthermore, the described embodiments are also able to be supplemented by further features from among those already described.

In the figures, identical reference characters in each case designate elements that are functionally identical.

FIG. 1 shows a system 10, which includes a motor vehicle 11 and a data glasses device 12. The data glasses device 12 can be provided in the motor vehicle 11. The data glasses device 12 includes data glasses 13 and a processor circuit 14. The processor circuit 14 can be integrated in the data glasses 13 or, as illustrated by way of example in FIG. 1, can be coupled to the data glasses 13 via a communication connection 15. For the purpose of providing or operating the communication connection 15, the data glasses 13 and the processor circuit 14 can each have a communication circuit 16, which can be based on a WLAN technology, for example. The data glasses 13 and the processor circuit 14 can also be connected by the communication circuit 16 via a communication cable (not illustrated), for example a USB cable (USB—Universal Serial Bus).

The data glasses 13 can be operated during travel 17 of the motor vehicle 11. In the data glasses 13, an image content 18 of a virtual environment 19 can be displayed to a user (not illustrated) wearing the data glasses 13 on his/her head, in which virtual environment the user can look around by turning and/or inclining his/her head and thus also moving the data glasses 13 relative to the motor vehicle 11 in a vehicle interior 20 of the motor vehicle 11. The change in perspective into the virtual environment 19 that arises in each case in the virtual environment 19, that is to say the change in the image content 18, can correspond here to the movement of the data glasses 13 relative to the motor vehicle 11.

For this purpose, the processor circuit 14 can acquire the position and/or movement of the data glasses 13 in relation to the motor vehicle 11 and adapt the image content 18 accordingly. For this purpose, the data glasses 13 can have at least one camera 21, the respective capture region 22 of which is oriented into an environment 23 of the data glasses 13 and thus into the vehicle interior 20. In other words, the capture region 22 faces away from the data glasses 13 toward the vehicle interior 20. Image data 24 from the at least one camera 21 can be transmitted to the processor circuit 14 via the communication connection 15, for example. A processing routine B can be used to reduce a degree of detail of the representation of the environment 23 in the image data 24.

On the basis of the image data 24, an image region 25 represented in the image data 24 can be evaluated in the processor circuit 14. Model data 26 of a digital model 27 of the vehicle interior 20 can be provided in the processor circuit 14. In contrast to the real vehicle interior 20, in this case in the model 27, however, it is possible to disregard user paraphernalia U, such as, for example, a cellular phone and/or a beverage cup and/or decoration, in the model 27. The model 27 can be based for example on CAD data of a design of the motor vehicle 11. The image data 24 and the model data 26 can be used to determine, by way of a matching routine 28 of the processor circuit 14, whether the image data 24 contain an image region 25 that matches the model 27. In FIG. 1, hatchings for a pane region symbolize that the matching routine 28 ought to ignore this region.

FIG. 1 illustrates, by way of example, how both the image data 24 and the model data 26 can describe an A-pillar 29 and a steering wheel 30 and a rear-view mirror 31, these merely being examples. Overall these are orientation objects 32 which can be recognized by the matching routine 28 in the vehicle interior 20. On the basis of the relative location of these recognized orientation objects 32, that is to say the match between the model 27 and the corresponding image region 25, a coordinate mapping 33 can be used to determine a relative position 34 of the data glasses 13 in the vehicle interior 20 in relation to the motor vehicle 11. This can be described for example as coordinate point 35 and/or as alignment vector or orientation vector 36.

By repeatedly acquiring the relative position 34 and calculating a change 37 with respect to time, it is also possible to track a movement of the data glasses 13 in the vehicle interior 20. On the basis of the relative position 34 and/or the movement of the data glasses 13, VR image data 38 of the virtual environment 19 can then be calculated and/or adapted. The resulting VR image data 38 can be displayed in the manner known per se in the data glasses 13 as image content 18 to the user of the data glasses 13 on a display unit 39, i.e. for example a stereoscopic screen and/or a projector (for AR glasses).

In order to plausibilize the determination of the relative position 34, a vehicle acceleration signal 41 can additionally be received from an acceleration sensor 40 of the motor vehicle 11, which signal can be correlated or compared or combined with the change 37 in the relative position 34 with respect to time.

Figure 2:
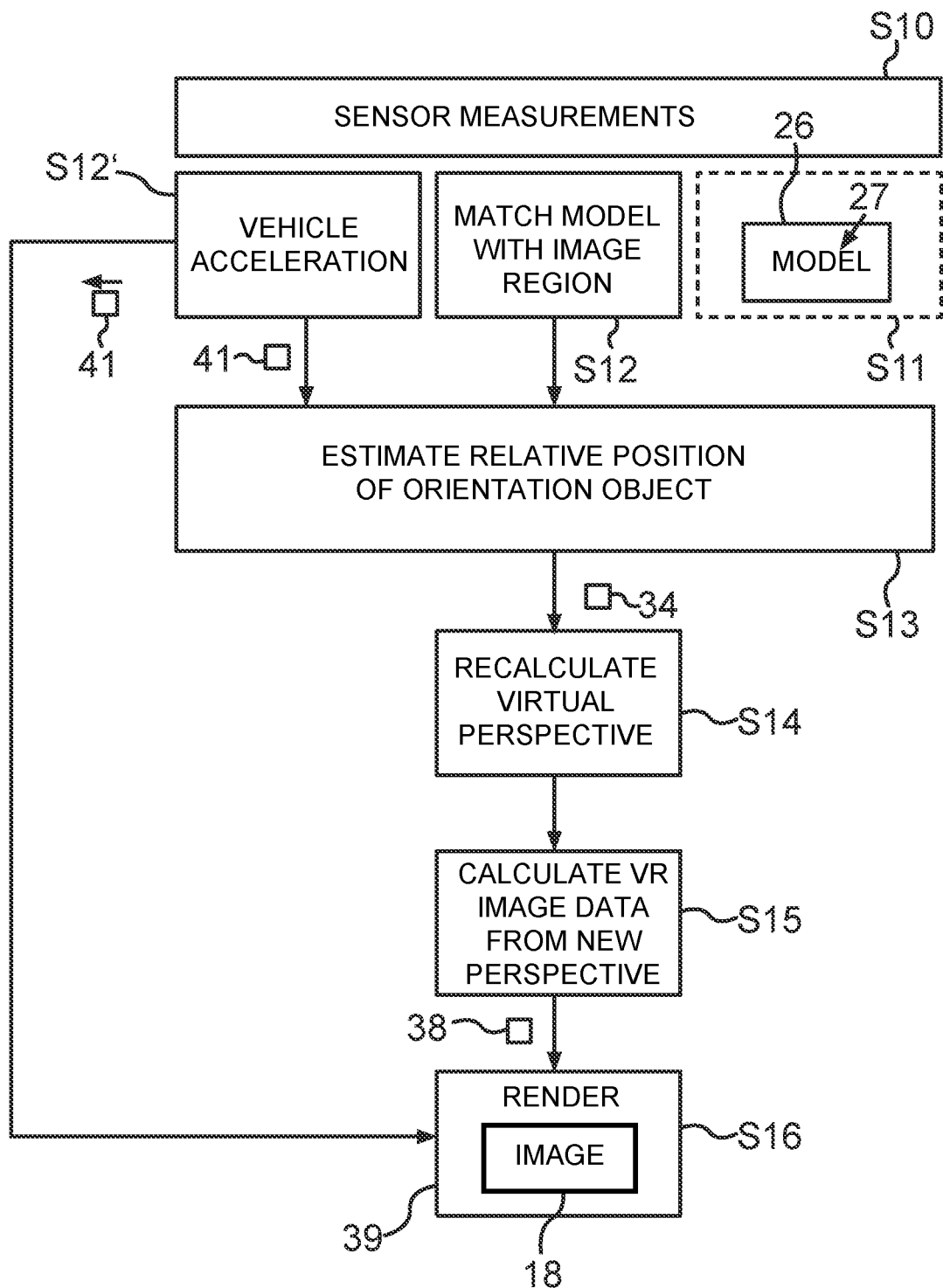
FIG. 2 is a flow chart concerning one embodiment of the method.

FIG. 2 illustrates a method that can be carried out by the processor circuit 14 for the purpose of generating the VR image data 38.

In S10, sensor measurements can be carried out, such as generating the image data 24 by the at least one camera 21 and optionally generating the vehicle acceleration signal 41 by the acceleration sensor 40. In S11, it is possible to provide the model data 26 for the model 27 of the at least one orientation object 32.

In S12, the matching routine 28 can be used to determine which image region 25 in the image data 24 matches the model 27 of the at least one orientation object.

In S13, the relative position 34 can be estimated, wherein both the output of the matching routine 28 and the vehicle acceleration signal 41 from S12' can be utilized.

The resulting change 37 with respect to time in the virtual perspective of the user into the virtual environment 19 can be recalculated in S14. In S15, the resulting VR image data 38 can be calculated on the basis of the new virtual perspective. In S16, the VR image data 38 can then be rendered by the display unit 39, such that the updated image content 18 is visible to the user in the data glasses 13. The vehicle acceleration signal 41 can be used in order that, without a recalculation of the VR image data 38, even between two calculations of the VR image data 38, an adaptation of the image content 18 is generated by a difference signal between a glasses acceleration signal of an acceleration sensor of the data glasses 13 (not illustrated) and the vehicle acceleration signal 41 being calculated and the difference being used to check whether the user has moved the data glasses 13 relative to the motor vehicle 11. An adaptation of the perspective into the virtual environment 19, that is to say an adaptation of the image content 18, can then be effected by pixel shifting of the calculated VR image data 38 without the recalculation thereof. It is thereby possible also to react to a movement of the data glasses 13 in the motor vehicle 11 which cannot be taken into account by recalculation of the VR image data 38 on account of the computational complexity or the computing power of the processor circuit 14.

This enables the use of an Augmented-Reality (AR) Head-Mounted display (HMD) and an application in an accelerated reference system, in particular in the traveling motor vehicle.

The AR HMD is based on a technology which enables the HMD to orient itself spatially in the environment. If e.g. a hologram of a virtual object is positioned at a specific location in the environment, and the user moves his/her head, the HMD captures this movement (6 DOF—degrees of freedom) and utilizes it in the local positioning of the hologram for the compensation of the head movement during the representation of the hologram. This can take place in real time in order that it appears to the user as though the hologram does not move away from the positioned location. For the detection of this movement, an inertial sensor system is not required in the HMD. The HMD is equipped with at least one camera (optical, infrared).

In order to use an AR-based HMD in the traveling vehicle, it must therefore be possible for the HMD to orient itself spatially in its immediate environment. One advantage in the traveling automobile is that the environment, i.e. the vehicle interior, remains constant. The decisive advantage on the part of the automobile manufacturer, then, is that the latter has a precise 3D model of the vehicle interior. As a result, it is then possible to carry out so-called "model tracking" (e.g. by the computer library https://visionlib.com), which calculates the relative position of the automobile interior in relation to the head/HMD position at any time for the HMD. Hereafter the tracked vehicle interior is then defined as the new reference coordinate system for the HMD. The HMD can thus orient itself spatially relative to the system in the vehicle interior and, as a result, position the holograms again in a stationary manner (relative to the vehicle interior). Since this technology is based on methods of computer vision (CV), it is also fast (has real-time capability). By virtue of this technology, one is even independent of the inertial sensor system of the HMD and is reliant only on an optical camera.

In addition, an external IMU can be utilized. In order to use an AR-based HMD in the traveling vehicle, it must therefore be possible for the HMD to orient itself spatially in its immediate environment. The decisive advantage on the part of the automobile manufacturer, then, is that the latter can provide the exact movement of the vehicle by way of the inertial sensor system thereof (IMUs in the vehicle). As a result, it is then possible to determine the head movement of the HMD relative to the vehicle interior by calculating the relative movement: IMU_relative=IMU_HMD−IMU_motor vehicle. In the AR-based HMD, the values of the IMU_HMD are then replaced by the relative values, that is to say IMU_relative. Thus, the HMD obtains consistent acceleration values relative to the vehicle interior and can orient itself spatially in the vehicle, despite external acceleration.

In the optimal case, solution approaches 1 (camera and model) and 2 (IMU_relative) can be combined in order to produce maximum stability with regard to spatial positioning of a hologram.

The proposal is distinguished in particular by the fact that it:

is independent of the inertial sensor system of the HMD and of the automobile (do not require any IMUs—Inertial Measurement Units), a precise 3D CAD model tracking is used for the orientation of the HMD in the traveling automobile, and the 3D CAD model can be chosen with high precision (that is to say can come from the automobile manufacturer).

Overall, the examples show how AR-based HMD can be provided in the traveling vehicle.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for operating data glasses in a motor vehicle, comprising:

storing, in a processor circuit provided in the data glasses or coupled to the data glasses via a communication connection, a digital model of at least one predetermined orientation object;

receiving, by the processor circuit, image data from at least one camera of the data glasses, the image data representing an environment of the data glasses;

checking, by a predetermined matching routine run by the processor circuit, whether the digital model matches an image region of the environment represented in the image data, the digital model describing a vehicle interior of the motor vehicle with a pane region of at least one window pane marked as irrelevant for said checking when an exterior region of the motor vehicle is visible through the at least one window pane in the motor vehicle from the vehicle interior;

determining a coordinate mapping by assigning, when a match is identified, a relative position to each of the at least one predetermined orientation object based on the image region; and rendering image content of the data glasses depending on the relative position of each of the at least one predetermined orientation object.

2. The method as claimed in claim 1, wherein the digital model describes a prototype of the motor vehicle independently of the motor vehicle and model data of the digital model are stored in the processor circuit.

3. The method as claimed in claim 2, wherein before said checking, the image data are processed by a predetermined processing routine to reduce detail in a representation of the environment in the image data.

4. The method as claimed in claim 3, wherein the matching routine includes a SLAM algorithm.

5. The method as claimed in claim 4, wherein when the digital model describes the vehicle interior of the motor vehicle with athe pane region of at least one window pane marked as irrelevant for said checking, where an exterior region of the motor vehicle is visible through the at least one window pane in the motor vehicle from the vehicle interior, no image information from the exterior region can disturb the checking by the matching routine.

6. The method as claimed in claim 5, further comprising discerning a movement signal based on a change in the relative position of each of the at least one predetermined orientation object with respect to time, the movement signal describing movement of the data glasses in relation to the motor vehicle.

7. The method as claimed in claim 6, further comprising:
receiving a glasses acceleration signal from a first acceleration sensor of the data glasses and a vehicle acceleration signal from a second acceleration sensor of the motor vehicle;
calculating a difference signal from the vehicle acceleration signal and the glasses acceleration signal and a plausibilization signal describing an estimated movement of the data glasses relative to the motor vehicle; and
at least one of comparing and combining the plausibilization signal with the movement signal.

8. The method as claimed in claim 1, wherein before said checking, the image data are processed by a predetermined processing routine to reduce detail in a representation of the environment in the image data.

9. The method as claimed in claim 1, wherein the matching routine includes a SLAM algorithm.

10. The method as claimed in claim 1, wherein when the digital model describes the vehicle interior of the motor vehicle with athe pane region of at least one window pane marked as irrelevant for said checking, where an exterior region of the motor vehicle is visible through the at least one window pane in the motor vehicle from the vehicle interior, no image information from the exterior region can disturb the checking by the matching routine.

11. A data glasses device operated in a motor vehicle, comprising:
data glasses having at least one camera; and
a processor circuit, one of provided in and coupled to the data glasses, the processor circuit having
a memory storing a digital model of at least one predetermined orientation object, and
a processor configured to
receive image data from the at least one camera of the data glasses, the image data representing an environment of the data glasses,
check, by running a predetermined matching routine, whether the digital model matches an image region of the environment represented in the image data, the digital model describing a vehicle interior of the motor vehicle with a pane region of at least one window pane marked as irrelevant for said check when an exterior region of the motor vehicle is visible through the at least one window pane in the motor vehicle from the vehicle interior,
determine a coordinate mapping by assigning, when a match is identified, a relative position to each of the at least one predetermined orientation object based on the image region, and
render image content of the data glasses depending on the relative position of each of the at least one predetermined orientation object.

12. The data glasses device as claimed in claim 11, wherein before the image data are checked, the image data are processed by a predetermined processing routine to reduce detail in a representation of the environment in the image data.

13. The data glasses device as claimed in claim 11, further comprising discerning a movement signal based on a change in the relative position of each of the at least one predetermined orientation object with respect to time, the movement signal describing movement of the data glasses in relation to the motor vehicle.

14. A system, comprising:
a motor vehicle;
data glasses having at least one camera; and
a processor circuit, one of provided in and coupled to the data glasses, the processor circuit having
a memory storing a digital model of at least one predetermined orientation object, and
a processor configured to
receive image data from the at least one camera of the data glasses, the image data representing an environment of the data glasses,
check, by running a predetermined matching routine, whether the digital model matches an image region of the environment represented in the image data, the digital model describing a vehicle interior of the motor vehicle with a pane region of at least one window pane marked as irrelevant for said check when an exterior region of the motor vehicle is visible through the at least one window pane in the motor vehicle from the vehicle interior,
determine a coordinate mapping by assigning, when a match is identified, a relative position to each of the at least one predetermined orientation object based on the image region, and
render image content of the data glasses depending on the relative position of each of the at least one predetermined orientation object.

15. The system as claimed in claim 14, wherein the digital model describes a prototype of the motor vehicle independently of the motor vehicle and model data of the digital model are stored in the memory of the processor circuit.

16. The system as claimed in claim 14, wherein when the digital model describes the vehicle interior of the motor vehicle with the pane region of at least one window pane marked as irrelevant for said checking, where an exterior region of the motor vehicle is visible through the at least one window pane in the motor vehicle from the vehicle interior, no image information from the exterior region can disturb the checking by the matching routine.

17. A method for operating data glasses in a motor vehicle, comprising:
storing, in a processor circuit provided in the data glasses or coupled to the data glasses via a communication connection, a digital model of at least one predetermined orientation object;
receiving, by the processor circuit, image data from at least one camera of the data glasses, the image data representing an environment of the data glasses;
checking, by a predetermined matching routine run by the processor circuit, whether the digital model matches an image region of the environment represented in the image data;
determining a coordinate mapping by assigning, when a match is identified, a relative position to each of the at least one predetermined orientation object based on the image region;
rendering image content of the data glasses depending on the relative position of each of the at least one predetermined orientation object;
discerning a movement signal based on a change in the relative position of each of the at least one predetermined orientation object with respect to time, the movement signal describing movement of the data glasses in relation to the motor vehicle;
receiving a glasses acceleration signal from a first acceleration sensor of the data glasses and a vehicle acceleration signal from a second acceleration sensor of the motor vehicle;
calculating a difference signal from the vehicle acceleration signal and the glasses acceleration signal and a plausibilization signal describing an estimated movement of the data glasses relative to the motor vehicle; and
at least one of comparing and combining the plausibilization signal with the movement signal.

18. A data glasses device operated in a motor vehicle, comprising:
data glasses having at least one camera; and
a processor circuit, one of provided in and coupled to the data glasses, the processor circuit having
a memory storing a digital model of at least one predetermined orientation object,
and
a processor configured to
receive image data from the at least one camera of the data glasses, the image data representing an environment of the data glasses,
check, by running a predetermined matching routine, whether the digital model matches an image region of the environment represented in the image data,
determine a coordinate mapping by assigning, when a match is identified, a relative position to each of the at least one predetermined orientation object based on the image region,
render image content of the data glasses depending on the relative position of each of the at least one predetermined orientation object,
discern a movement signal based on a change in the relative position of each of the at least one predetermined orientation object with respect to time, the movement signal describing movement of the data glasses in relation to the motor vehicle,
receive a glasses acceleration signal from a first acceleration sensor of the data glasses and a vehicle acceleration signal from a second acceleration sensor of the motor vehicle,
calculate a difference signal from the vehicle acceleration signal and the glasses acceleration signal and a plausibilization signal describing an estimated movement of the data glasses relative to the motor vehicle, and
at least one of compare and combine the plausibilization signal with the movement signal.

19. A system, comprising:
a motor vehicle;
data glasses having at least one camera; and
a processor circuit, one of provided in and coupled to the data glasses, the processor circuit having
a memory storing a digital model of at least one predetermined orientation object,
and
a processor configured to
receive image data from the at least one camera of the data glasses, the image data representing an environment of the data glasses,
check, by running a predetermined matching routine, whether the digital model matches an image region of the environment represented in the image data,
determine a coordinate mapping by assigning, when a match is identified, a relative position to each of the at least one predetermined orientation object based on the image region,
render image content of the data glasses depending on the relative position of each of the at least one predetermined orientation object,
discern a movement signal based on a change in the relative position of each of the at least one predetermined orientation object with respect to time, the movement signal describing movement of the data glasses in relation to the motor vehicle,
receive a glasses acceleration signal from a first acceleration sensor of the data glasses and a vehicle acceleration signal from a second acceleration sensor of the motor vehicle,
calculate a difference signal from the vehicle acceleration signal and the glasses acceleration signal and a plausibilization signal describing an estimated movement of the data glasses relative to the motor vehicle, and
at least one of compare and combine the plausibilization signal with the movement signal.

* * * * *

UNITED STATES PATENT AND TRADEMARK OFFICE
CERTIFICATE OF CORRECTION

| | |
|---|---|
| PATENT NO. | : 12,093,444 B2 |
| APPLICATION NO. | : 17/800308 |
| DATED | : September 17, 2024 |
| INVENTOR(S) | : Sebastian Dorn |

It is certified that error appears in the above-identified patent and that said Letters Patent is hereby corrected as shown below:

In the Claims,

Column 9, Line 21:
In Claim 5, delete "athe" and insert --the--.

Column 9, Line 55:
In Claim 10, delete "athe" and insert --the--.

Signed and Sealed this
Third Day of December, 2024

Katherine Kelly Vidal
*Director of the United States Patent and Trademark Office*